United States Patent
Tempel et al.

(10) Patent No.: US 9,252,958 B1
(45) Date of Patent: Feb. 2, 2016

(54) SYSTEMS AND METHODS FOR PROVIDING A SELF-MAINTAINING PKI INFRASTRUCTURE AMONG LOOSELY CONNECTED ENTITIES

(71) Applicant: Crimson Corporation, Dover, DE (US)

(72) Inventors: Mark Tempel, Minneapolis, MN (US); Alex Ivanoff, Maple Grove, MN (US)

(73) Assignee: Crimson Corporation, Dover, DE (US)

( * ) Notice: Subject to any disclaimer, the term of this patent is extended or adjusted under 35 U.S.C. 154(b) by 21 days.

(21) Appl. No.: 14/206,860

(22) Filed: Mar. 12, 2014

(51) Int. Cl.
*H04L 29/06* (2006.01)
*H04L 9/32* (2006.01)

(52) U.S. Cl.
CPC ............ *H04L 9/3263* (2013.01); *H04L 9/3268* (2013.01); *H04L 9/3271* (2013.01); *H04L 63/0823* (2013.01)

(58) Field of Classification Search
CPC .. H04L 9/3268; H04L 9/3271; H04L 63/0823
USPC .................................................. 713/156–158
See application file for complete search history.

(56) References Cited

U.S. PATENT DOCUMENTS

| | | | | |
|---|---|---|---|---|
| 5,712,914 A * | 1/1998 | Aucsmith et al. | ............... | 380/30 |
| 6,175,626 B1 * | 1/2001 | Aucsmith et al. | ............... | 380/30 |
| 6,327,652 B1 * | 12/2001 | England et al. | ................... | 713/2 |
| 6,330,670 B1 * | 12/2001 | England et al. | ................... | 713/2 |
| 6,820,063 B1 * | 11/2004 | England et al. | ................. | 705/54 |
| 7,194,092 B1 * | 3/2007 | England et al. | ............... | 380/262 |
| 7,536,544 B2 * | 5/2009 | Xiao | ............................. | 713/158 |
| 7,698,557 B2 * | 4/2010 | Saarepera et al. | ............ | 713/175 |
| 8,356,172 B2 * | 1/2013 | Howcroft et al. | ............ | 713/156 |
| 8,401,940 B1 * | 3/2013 | Havemose | ...................... | 705/34 |
| 8,401,941 B1 * | 3/2013 | Havemose | ...................... | 705/34 |
| 8,601,555 B2 * | 12/2013 | Qin et al. | ......................... | 726/6 |
| 8,719,576 B2 * | 5/2014 | Buldas et al. | ................ | 713/175 |
| 8,776,192 B2 * | 7/2014 | Schiefelbein | ..................... | 726/6 |
| 8,850,189 B2 * | 9/2014 | Sie et al. | ........................ | 713/156 |
| 8,856,514 B2 * | 10/2014 | Dixon et al. | ................. | 713/156 |
| 8,862,874 B2 * | 10/2014 | Hazlewood et al. | .......... | 713/158 |
| 8,924,269 B2 * | 12/2014 | Seubert et al. | ................. | 705/35 |
| 8,924,717 B2 * | 12/2014 | Sugano | ........................ | 713/158 |
| 8,959,337 B2 * | 2/2015 | Dixon et al. | ................. | 713/157 |
| 8,966,260 B1 * | 2/2015 | Walter et al. | ................. | 713/168 |
| 8,972,740 B2 * | 3/2015 | Garrity et al. | ................. | 713/182 |

\* cited by examiner

*Primary Examiner* — Haresh N Patel
(74) *Attorney, Agent, or Firm* — Austin Rapp & Hardman (57) ABSTRACT

A managed node may determine that a current public key and a current private key associated with a managed node will expire within a threshold period of time. A current managed node certificate may include the current public key and be associated with the current private key. The managed node may create a request for a new certificate for the managed node. The request may be created prior to expiration of the current managed node certificate. The managed node may sign the request for the new certificate using the current private key. The managed node may send the request for the new certificate to a core server.

16 Claims, 11 Drawing Sheets

SYSTEMS AND METHODS FOR PROVIDING A SELF-MAINTAINING PKI INFRASTRUCTURE AMONG LOOSELY CONNECTED ENTITIES

TECHNICAL FIELD

The present disclosure generally relates to computers and computer-related technology. More specifically, the present disclosure relates to systems and methods for providing a self-maintaining public-key infrastructure (PKI) among loosely connected entities.

BACKGROUND

With the prolific use of the Internet, many people and businesses have come to rely on network communications. Because of this reliance, the need for secure means of transmitting data has become significant for individuals and businesses alike. As a consequence, there is an ever present need for evolving security in communications over networks and the Internet. In particular, there is a need for improved approaches to ensuring the confidentiality of private information.

Cryptography is the practice and study of techniques for secure communication in the presence of third parties. Public-key cryptography, which is also known as asymmetric cryptography, refers to a cryptographic algorithm that requires two separate keys: a private key and a public key. These keys may be referred to collectively as a key pair. The private key is kept secret, but the public key is widely distributed. A private key and its corresponding public key are mathematically linked, but the parameters are chosen so that calculating the private key from the public key is extremely difficult.

Public-key cryptography facilitates the use of digital signatures. In particular, a message that is digitally "signed" (i.e., processed in accordance with an appropriate cryptographic algorithm) using the sender's private key may be verified by anyone who has access to the sender's public key. A valid digital signature gives a recipient reason to believe that the message was actually created by the sender.

One issue associated with the use of public-key cryptography is related to determining whether a particular public key is authentic, i.e., whether the public key is correct and belongs to the person or entity claimed, and has not been tampered with or replaced by a malicious third party. Typically, a public-key infrastructure system is used to address the issue of authenticity. Aspects of the present disclosure are directed to improvements related to management of public-key infrastructure systems.

DETAILED DESCRIPTION

A method for updating a digital certificate is disclosed. The method includes determining that a current public key and a current private key associated with a managed node will expire within a threshold period of time. A current managed node certificate comprises the current public key and is associated with the current private key. The method also includes creating a request for a new certificate for the managed node. The request is created prior to expiration of the current managed node certificate. The method also includes signing the request for the new certificate using the new private key and sending the request for the new certificate to a core server.

Creating the request for the new certificate may include creating a new public key and a new private key for the managed node. The request for the new certificate may include a new public key and information that identifies the managed node.

The method may also include receiving the new certificate from the core server and associating the new certificate with a new private key. The new certificate may be requested and received without the managed node providing the core server with external authentication.

The method may also include receiving a new root certificate from the core server. The new root certificate may be received prior to expiration of a current root certificate. The method may also include authenticating the new root certificate using the current root certificate. The new root certificate may be received and authenticated without external authentication with a certificate authority.

Communication between the managed node and the core server may occur via a direct connection between the managed node and the core server. Alternatively, communication between the managed node and the core server may occur via an intermediary. The method may be performed automatically without human intervention.

A computing device that is configured for updating a digital certificate is also disclosed. The computing device includes a processor, memory in electronic communication with the processor, and instructions stored in the memory. The instructions are executable to determine that a current public key and a current private key associated with a managed node will expire within a threshold period of time. A current managed node certificate comprises the current public key and is associated with the current private key. The instructions are also executable to create a request for a new certificate for the managed node. The request may be created prior to expiration of the current managed node certificate. The instructions are also executable to sign the request for the new certificate using a new private key and to send the request for the new certificate to a core server.

A non-transitory tangible computer-readable medium for updating a digital certificate is also disclosed. The computer-readable medium includes executable instructions for determining that a current public key and a current private key associated with a managed node will expire within a threshold period of time. A current managed node certificate comprises the current public key and is associated with the current private key. The computer-readable medium also includes executable instructions for creating a request for a new certificate for the managed node. The request is created prior to expiration of the current managed node certificate. The computer-readable medium also includes executable instructions for signing the request for the new certificate using a new private key and for sending the request for the new certificate to a core server.

As indicated above, aspects of the present disclosure are directed to improvements related to management of public-key infrastructure (PKI) systems. A PKI system facilitates the issuance, storage, and distribution of digital certificates. A digital certificate is an electronic document that uses a digital signature to bind a public key with an entity. Thus, digital certificates may be used to verify that a particular public key belongs to a certain entity.

A PKI system includes a certificate authority, which oversees the issuance and maintenance of digital certificates for entities belonging to the PKI system. A certificate authority may issue multiple certificates in the form of a tree structure. A root certificate is the top-most certificate of the tree. All certificates immediately below the root certificate inherit the trustworthiness of the root certificate.

A key pair and its corresponding digital certificate (i.e., a digital certificate that includes the public key of the key pair) have a limited lifetime. When a key pair and its corresponding digital certificate expire, a new key pair and a new digital certificate should be issued. In many known PKI systems, the process of issuing new key pairs/digital certificates may require manual intervention from a human operator, and may also require some external form of authentication to complete. One aspect of the present disclosure relates to improved techniques for issuing new key pairs and corresponding digital certificates within a PKI system.

The root certificate is distributed to each entity within the PKI system. Thus, when a root certificate expires, a new root certificate should be distributed to each entity within the PKI system. However, it is difficult to distribute new root certificates in a trusted fashion. Another aspect of the present disclosure relates to improved techniques for distributing a new root certificate to entities within a PKI system.

Figure 1:
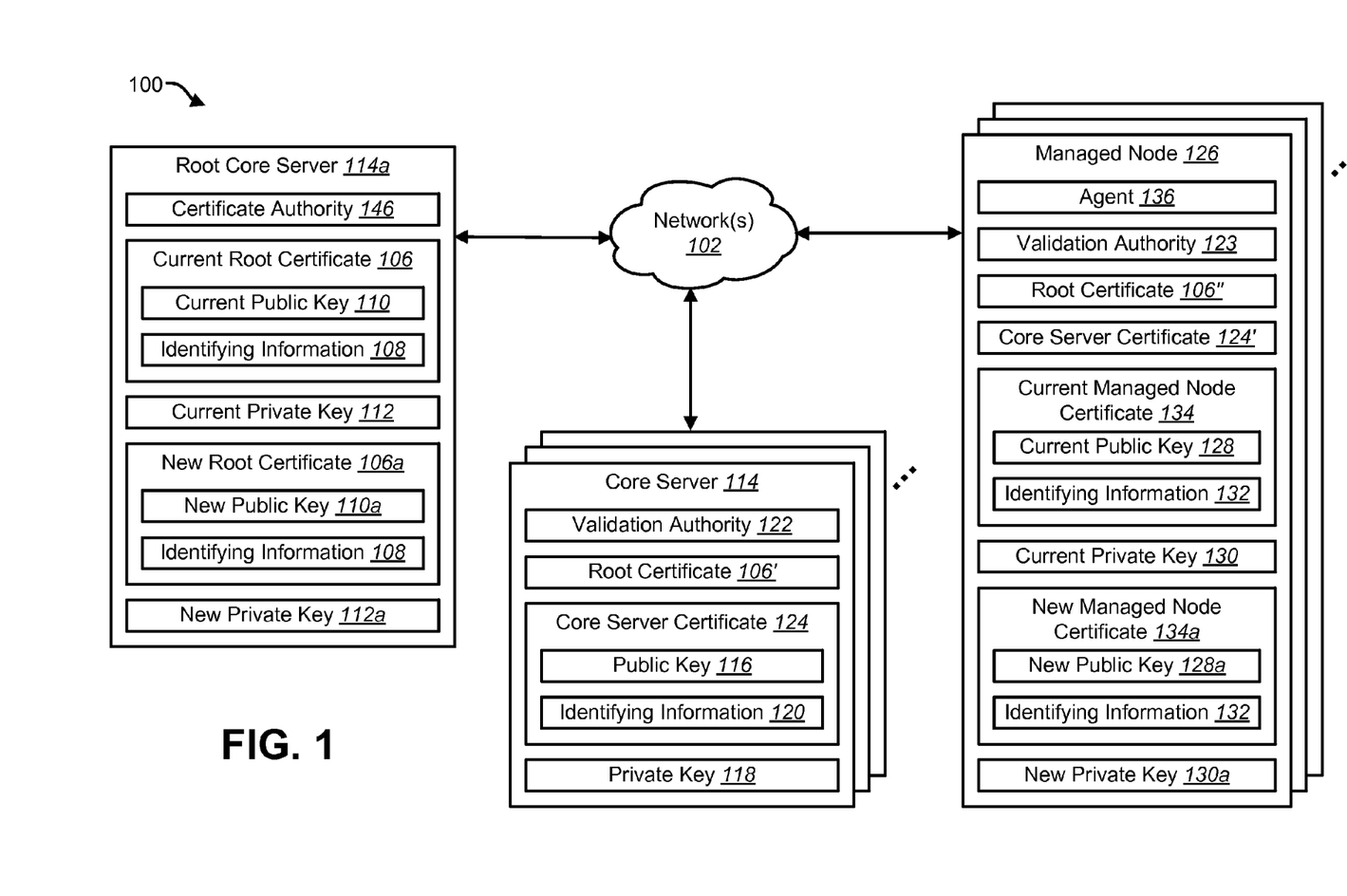
FIG. 1 is a block diagram illustrating a system in which aspects of the present disclosure may be implemented.

Aspects of the present disclosure will be described in relation to an enterprise management system that includes various components for managing computing devices belonging to an enterprise. Reference is initially made to FIG. 1, which illustrates an enterprise management system 100 that includes a plurality of computing devices that are in electronic communication with one another via one or more computer networks 102. The network(s) 102 may include one or more Local Area Networks (LANs), Wide Area Networks (WANs), Wireless Local Area Networks (WLANs), the Internet, etc.

Each of the computing devices shown in FIG. 1 may belong to an enterprise (e.g., a business, a university, a non-profit organization, a government agency, etc.). There are two different types of computing devices shown in FIG. 1: managed nodes 126 and core servers 114. The managed nodes 126 may be desktop computers, laptop computers, tablet computers, smartphones, etc. The core servers 114 may perform a variety of management-related operations with respect to the managed nodes 126. Agents 136 running on the managed nodes 126 may work together with the core servers 114 to perform management-related operations. Each core server 114 may be responsible for managing one or more managed nodes 126.

The enterprise management system 100 shown in FIG. 1 may implement a PKI system. The PKI system may be implemented using the core servers 114 and the agents 136 running on the managed nodes 126. One of the core servers 114 may be designated as a root core server 114a. The root core server 114a may include a certificate authority 146. A digital certificate 106 that identifies the certificate authority 146 may be referred to as a root certificate 106. The root certificate 106 may include a public key 110 of the certificate authority 146 and information 108 identifying the certificate authority 146. The root certificate 106 may be associated with a private key 112 of the certificate authority 146.

Other core servers 114 within the system 100 may have a copy of the root certificate 106' installed to validate messages authenticated by the root core server 114a. In this context, the phrase "authenticated by" refers to verifying that the message signer has a chain of trust that is anchored by the root core server 114a, or in other words, verifying that the message signer's certificate has been issued by the root certificate 106 or by a certificate issued by the root certificate 106. The other core servers 114 within the system 100 may also have their own digital certificates 124 issued to them. These certificates 124 may be referred to herein as core server certificates 124. When a core server 114 joins the network 102, it may request that the root core server 114a issue the core server 114 a core server certificate 124. Each core server certificate 124 may include a public key 116 of the core server 114 and information 120 identifying the core server 114. Each core server certificate 124 may also be associated with a private key 118 of the core server 114.

The managed nodes 126 may each have a copy of the root certificate 106" and a copy of the core server certificate 124' of its managing core server 114 installed to validate messages authenticated by the root core server 114a and core server 114, respectively. When a managed node 126 joins the network 102, it may request that its managing core server 114 issue the managed node 126 a digital certificate 134. This certificate 134 may be referred to herein as a managed node certificate 134.

The managed nodes 126 may each have an agent 136 installed. As indicated above, the agents 136 running on the managed nodes 126 may perform tasks related to management of digital certificates. For example, an agent 136 may determine the lifetime of the current managed node certificate 134. In addition, as indicated above, agents 136 running on the managed nodes 126 may work together with the core servers 114 to perform management-related operations. For example, an agent 136 may communicate with a core server 114 to perform tasks related to management of digital certificates. Some of these tasks may be related to obtaining a managed node certificate 134, requesting that a new managed node certificate 134a be issued from the managing core server 114 when the current managed node certificate 134 is nearing expiration, and installing root certificates 106. The agents 136 enable secure renewal of managed node certificates 134 (and corresponding key pairs) and secure distribution of new root certificates 106, all without the requirement of external authentication or human intervention.

Figure 2:
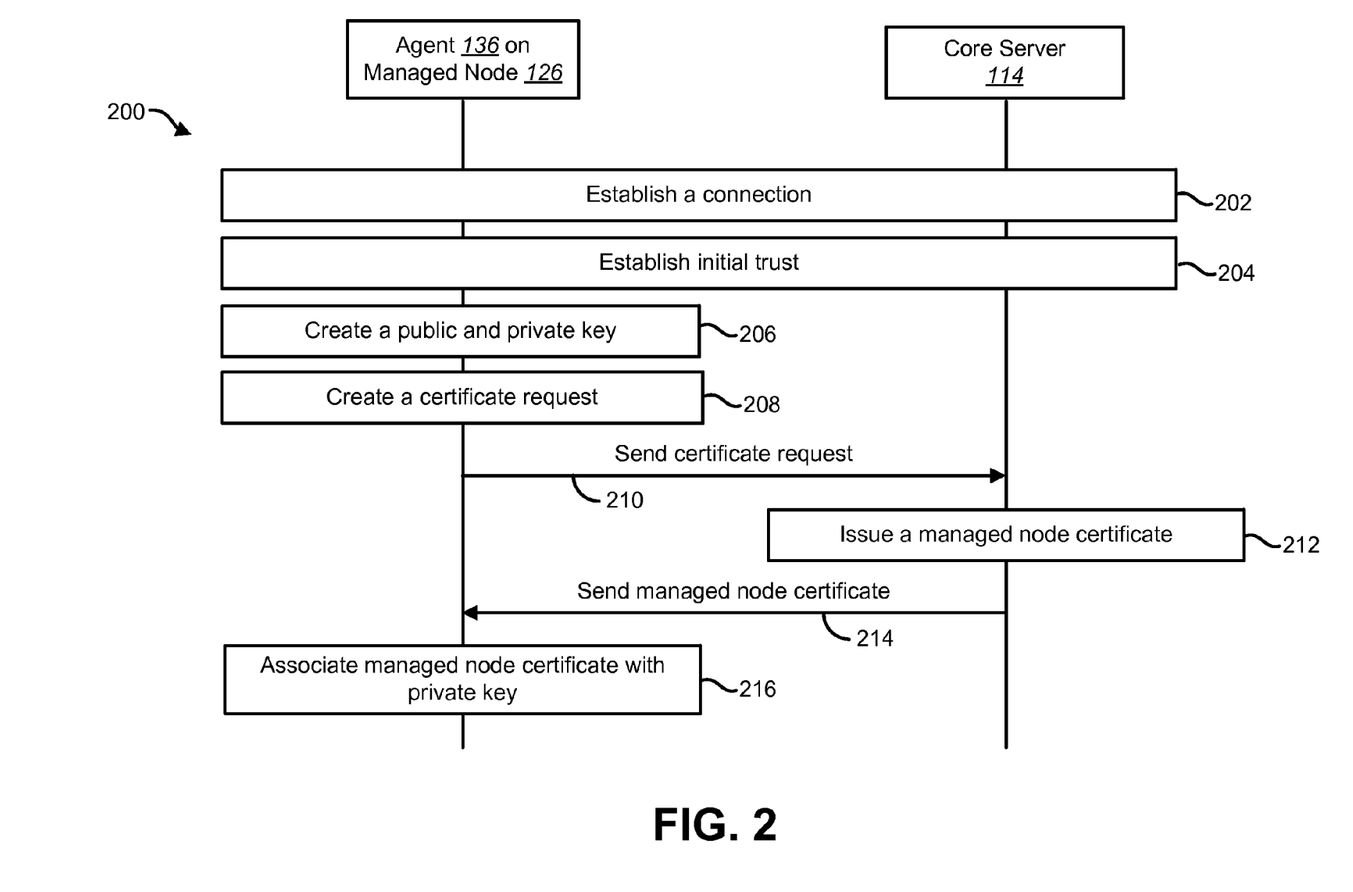
FIG. 2 illustrates various operations that may be performed by a managed node and a core server with respect to initial issuance of a digital certificate for the managed node.

Reference is now made to FIG. 2, which illustrates various operations 200 that may be performed when a core server 114 initially issues a certificate 134 to a managed node 126. An agent 136 running on the managed node 126 may establish 202 a connection to the core server 114. In order for the managed node 126 to obtain access to the network 102, the agent may establish 204 some form of initial trust with the core server 114. This trust may be in the form of a single-use, very short-lifetime cookie that is randomly generated during an automated installation of the agent 136 on the managed node 126 and known to both the agent 136 and the core server 114. Alternatively, this initial trust may involve the use of computer credentials or a shared password during manual installation of the agent 136 on the managed node 126.

After this initial trust is established 204, the agent 136 may then create 206 a public key 128 and a private key 130 for the managed node 126. The agent 136 may then create 208 a certificate request that includes the newly created public key 128 and information 132 identifying the managed node 126. The identifying information 132 may be the managed node's serial number or some other identifier. The agent 136 may then send 210 its certificate request to the core server 114.

The core server 114 may use the identifying information 132 and the public key 128 provided in the certificate request to issue 212 a digital certificate 134 for the managed node 126. This managed node certificate 134 may include the public key 128, the identifying information 132, and any certificate extensions provided in the certificate request. The core server 114 may sign the managed node certificate 134 using the core server's private key 118 and send 214 the signed managed node certificate 134 to the managed node 126. The agent 136 may associate 216 its newly created private key 130 with the managed node certificate 134.

Figure 3:
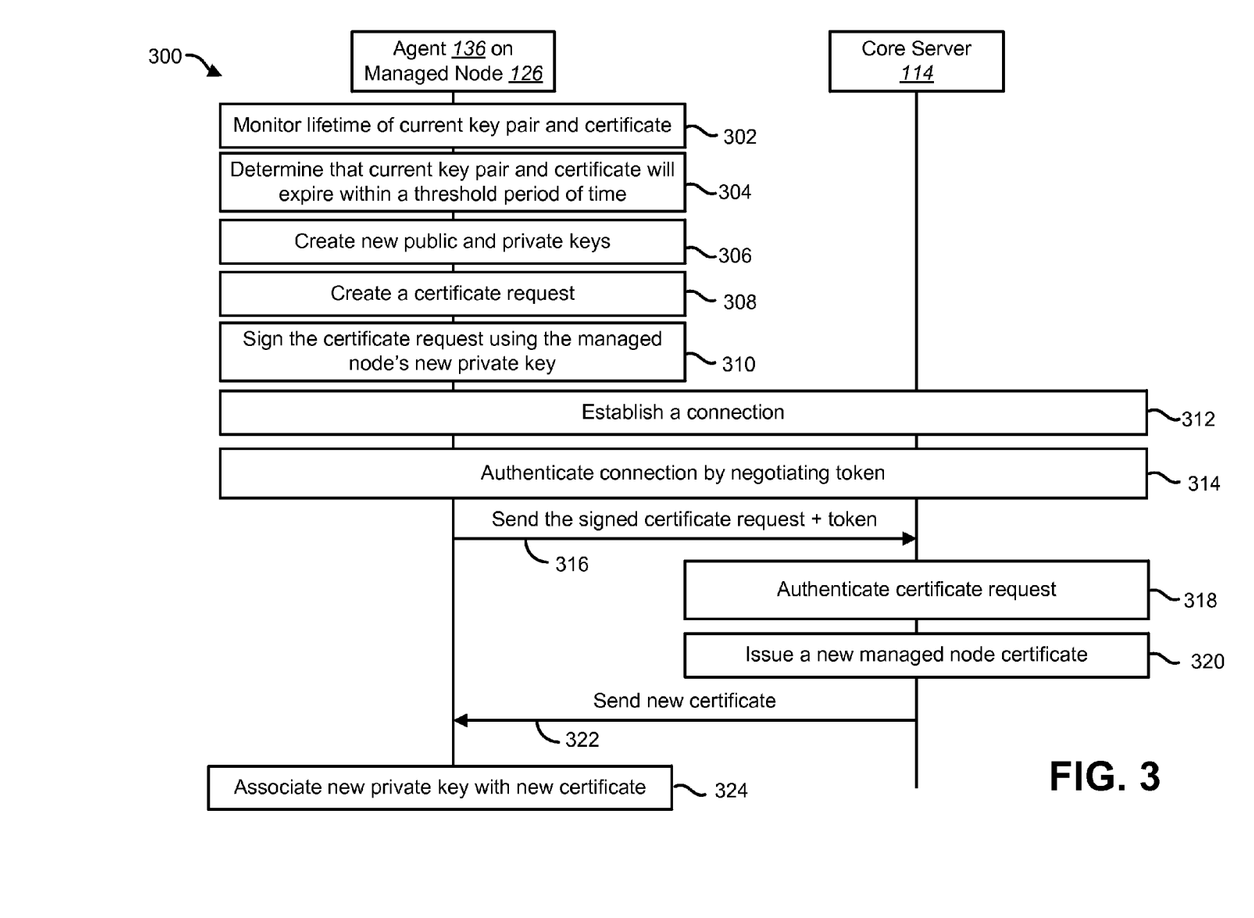
FIG. 3 illustrates various operations that may be performed by an agent operating on a managed node and a core server with respect to issuance of a new digital certificate for the managed node.

Reference is now made to FIG. 3, which illustrates various key-pair and corresponding certificate management operations 300 that may be performed by a managed node 126 and a core server 114.

As indicated above, a key pair and its corresponding digital certificate have a limited lifetime. The agent 136 may monitor 302 the lifetime of the managed node's current key pair (the managed node's current public key 128 and current private key 130) and its corresponding current managed node certificate 134. When the agent 136 determines 304 that the managed node's current key pair and corresponding current managed node certificate 134 will expire within a period of time that is less than a defined threshold (e.g., fewer than six months), the agent 136 may create 306 a new public key 128a and a new private key 130a for the managed node 126. The agent 136 may then create 308 a request for a new managed node certificate 134a. This certificate request may include the new public key 128a and identifying information 132 of the managed node 126. This certificate request may then be signed 310 by the agent 136 using the managed node's new private key 130a. The agent 136 and the core server 114 may establish 312 a direct connection. The agent 136 may authenticate 314 the connection to the core server 114 by negotiating a token using the managed node's current private key 130. The agent 136 may then send 316 its signed certificate request accompanied by the negotiated token to the core server 114.

Advantageously, the certificate request may be created 308, signed 310 and sent 316 prior to expiration of the current managed node certificate 134. If the agent 136 were to wait until after the current managed node certificate 134 expires before requesting a new managed node certificate 134a, it would be necessary to re-establish trust with the core server 114 using some form of external authentication (similar to step 204 in FIG. 2) in order to request a new managed node certificate 134a. In this context, the phrase "external authentication" refers to authentication other than the authentication that is provided through the use of a valid digital certificate. By monitoring the lifetime of the current managed node certificate 134 and requesting a new managed node certificate 134a before the current managed node certificate 134 expires, the agent 136 is able to use the already established trust relationship between the agent 136 and the core server 114 (i.e., the current managed node certificate 134) and does not need to provide external authentication.

A validation authority 122 on the core server 114 authenticates 318 the certificate request, i.e., verifies that the certificate request is from a trusted entity (the managed node 126) and should be processed. In order to authenticate 318 the certificate request, the validation authority 122 may use the managed node's current public key 128 contained within the managed node's current certificate 134 to verify the signature of the token accompanying the certificate request. Upon authentication 318, the core server 114 may use the identifying information 132 and the new public key 128a provided in the certificate request to issue 320 a new managed node certificate 134a. The core server 114 may then send 322 the new managed node certificate 134a to the managed node 126.

The managed node 126 may associate 324 its new private key 130a with the new managed node certificate 134a. The operations 300 may then be repeated for the new managed node certificate 134a. For example, the agent 136 may begin monitoring 302 the lifetime of the new key pair (the new public key 128a and the new private key 130a) and its corresponding new managed node certificate 134a.

Figure 4:
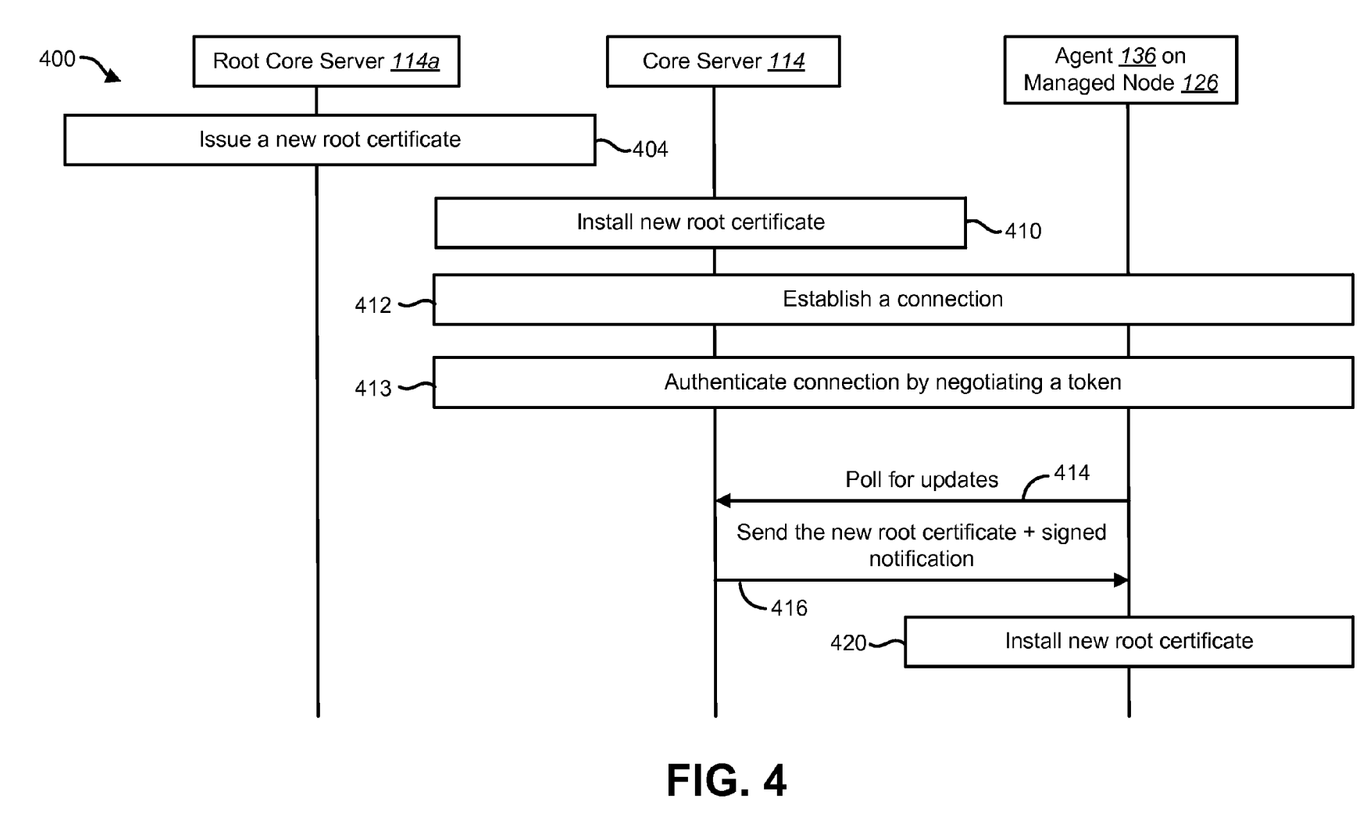
FIG. 4 illustrates various operations that may be performed by a managed node, a core server, and a root core server with respect to distribution of a new root certificate.

FIG. 4 illustrates various root certificate management operations 400 that may be performed by a managed node 126, a core server 114, and a root core server 114a.

At some point, an operator of the root core server 114a (e.g., a system administrator) may issue 404 a new root certificate 106a. The administrator may issue 404 the new root certificate 106a when the current root certificate 106 and its corresponding key pair are nearing expiration. The new root certificate 106a may include a new public key 110a and identifying information 108 of the certificate authority 146. A new private key 112a is also created that corresponds to the new public key 110a. The new root certificate 106a should be distributed to the core servers 114 and managed nodes 126 within the system 100 for future secure communication. Distribution of the new root certificate 106a from the root core server 114a to subordinate core servers 114 within the system 100 may occur manually. FIG. 4 shows the core server 114 installing 410 the new root certificate 106a.

The core server 114 and the managed node 126 may establish 412 a connection. The agent 136 and the core server 114 may authenticate 413 the connection by negotiating a token. The agent 136 may periodically poll 414 the core server 114 for updates. In response to receiving a poll from the agent 136 at some point after the core server 114 has installed 410 the new root certificate 106a, the core server 114 may notify the agent 136 that the new root certificate 106a is available and should be installed. In particular, the core server 114 may send 416 the new root certificate 106a to the agent 136 along with a notification signed by the current root certificate 106 that the new root certificate 106a should be installed. The agent 136 trusts the notification to install the new root certificate 106a because of the signature of the notification. Thus, the new root certificate 106a is authenticated using the current root certificate 106. The agent 136 may install 420 the new root certificate 106a for future secure communication.

Advantageously, the new root certificate 106a may be distributed to the managed node 126 prior to expiration of the current root certificate 106. If the new root certificate 106a were not distributed until after the current root certificate 106 expires, it would be necessary to re-establish trust between the certificate authority 146, the core server 114 and the managed node 126 using some form of external authentication. By distributing the new root certificate 106a before the current root certificate 106 expires, the agent 136 is able to use the already established trust relationships between the agent 136 and the certificate authority 146 (i.e., the current root certificate 106) and between the core server 114 and the certificate authority 146 (i.e., the core server certificate 124) so that there is no need to provide external authentication.

For clarity, the operations 300, 400 shown in FIGS. 3 and 4 are described with respect to a single managed node 126 and a single core server 114. However, a system 100 in accordance with the present disclosure may include many managed nodes 126 and many core servers 114. Each managed node 126 within the system 100 may perform operations 300, 400 similar to those shown in FIGS. 3 and 4. A core server 114 may be responsible for managing a plurality of managed nodes 126. The core server 114 may perform operations similar to those 300, 400 shown in FIGS. 3 and 4 for each managed node 126 that the core server 114 is responsible for managing.

Because external authentication is not needed in order to obtain new managed node certificates 134a and to distribute new root certificates 106a, the system 100 may be considered to be a "self-maintaining" PKI system 100. In other words, new managed node certificates 134a may be obtained and new root certificates 106a may be distributed between core servers 114 and managed nodes 126 automatically without human intervention.

In the operations 300, 400 shown in FIGS. 3 and 4, communication between the managed node 126 and the core server 114 may occur via a direct connection (e.g., a connection via a local area network, either wired or wireless). Alternatively, communication between the managed node 126 and the core server 114 may occur via one or more intermediary computing nodes. In this context, the term "intermediary" refers to one or more computing entities that facilitate communication between core servers 114 and managed nodes 126. An intermediary may be accessible via the Internet or via one or more private networks.

Figure 5:
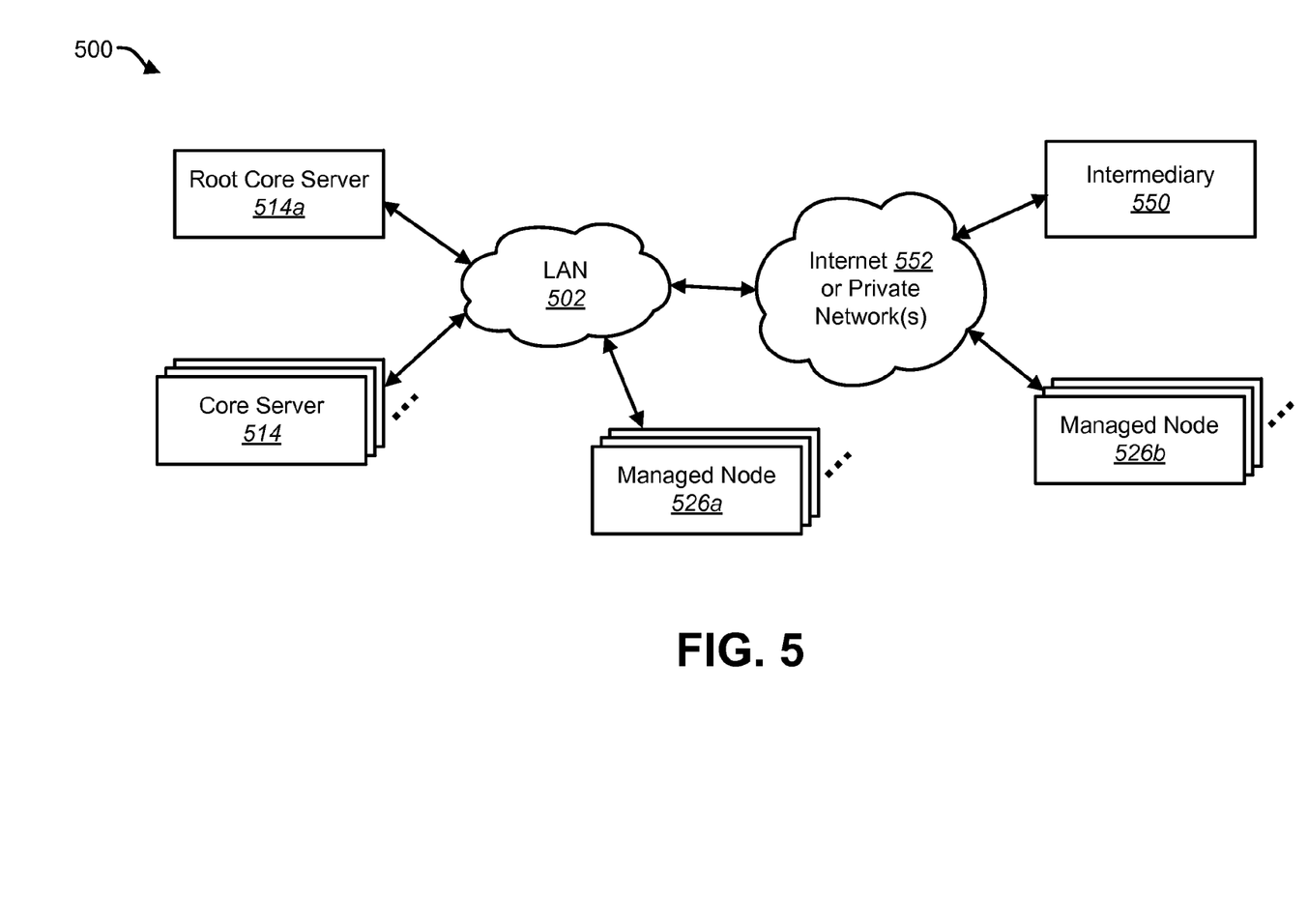
FIG. 5 is a block diagram illustrating another system in which aspects of the present disclosure may be implemented.

FIG. 5 illustrates a system 500 in which a plurality of core servers 514, including a root core server 514a, are connected to an enterprise's local area network (LAN) 502. Although some of the enterprise's managed nodes 526a may be connected to the LAN 502, some of the enterprise's managed nodes 526b may not be connected to the LAN 502. For example, some of the enterprise's managed nodes 526b may be used by employees who work remotely, who are traveling on behalf of the enterprise, etc. The LAN 502 is connected to the Internet 552 (or to one or more other private networks). An intermediary 550 that is also connected to the Internet 552 (or the private network(s)) may facilitate the use of the certificate management operations described herein for the managed nodes 526b that are not directly connected to the enterprise's LAN 502.

The root core server 514a, core servers 514 and managed nodes 526a-b may be configured similarly to the root core server 114a, core servers 114 and managed nodes 126 described previously, unless specifically indicated otherwise.

Figure 6A:
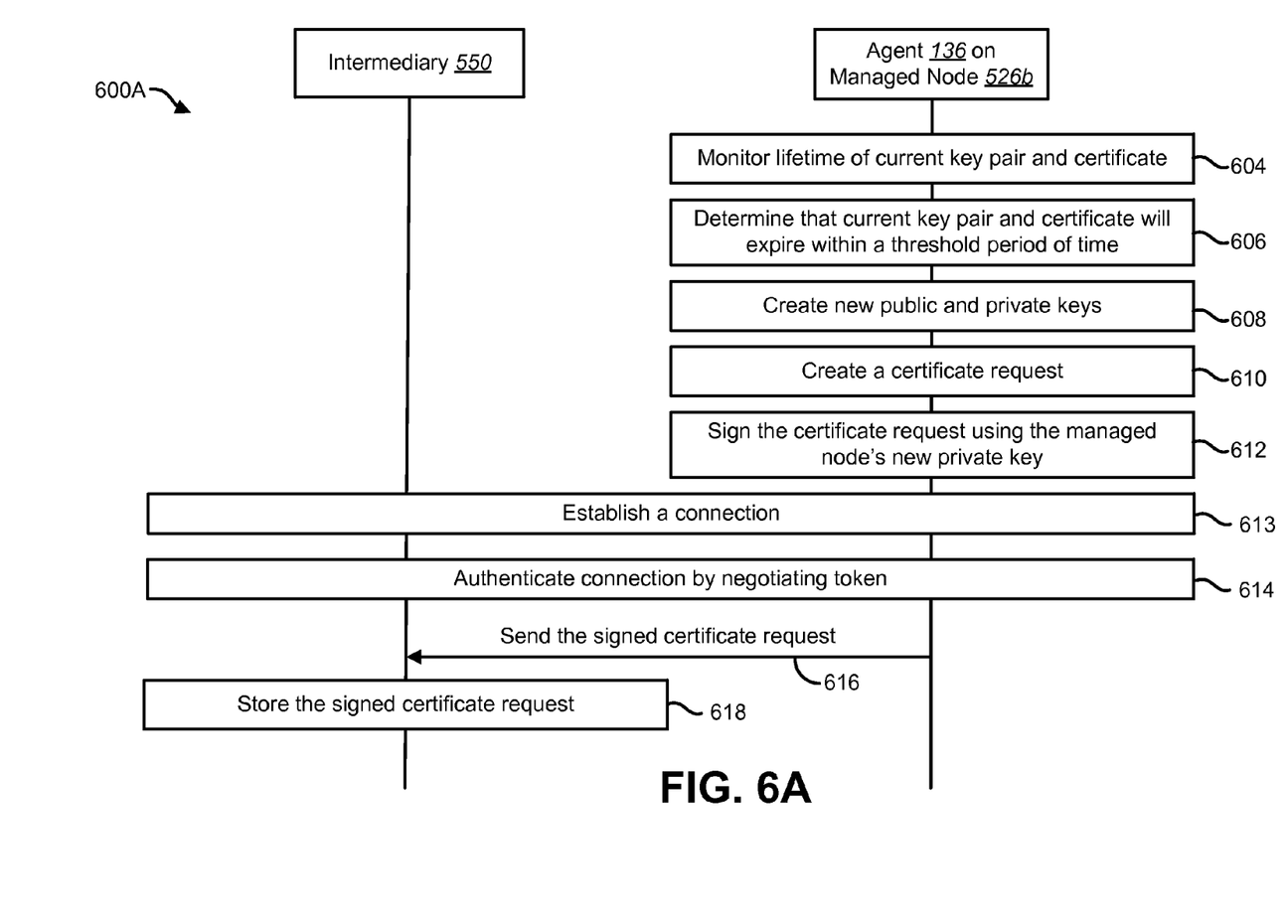
FIGS. 6A-C illustrate various operations that may be performed by a managed node, a core server, and an intermediary with respect to issuance of a new digital certificate for the managed node.
Figure 6B:
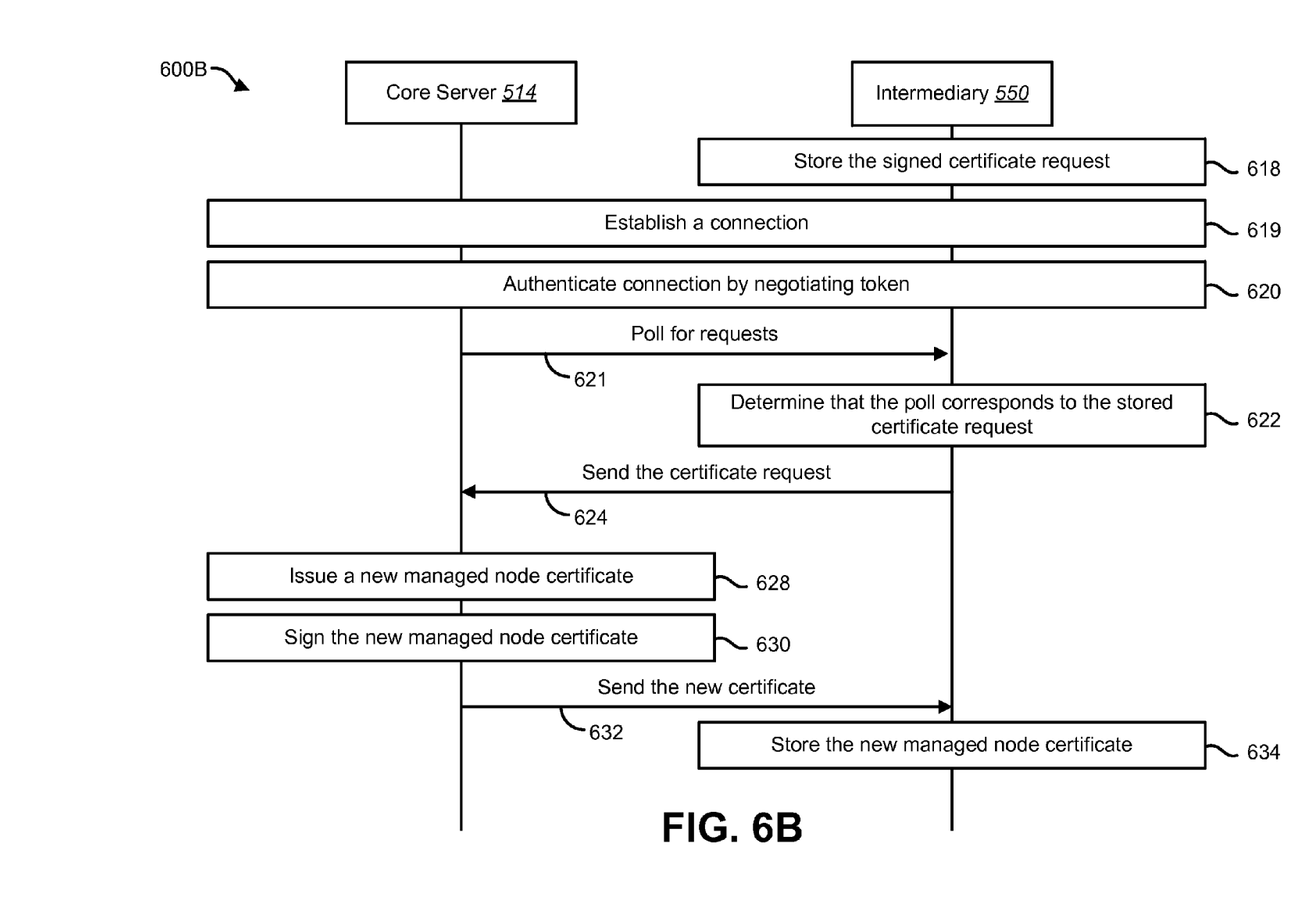
Figure 6C:
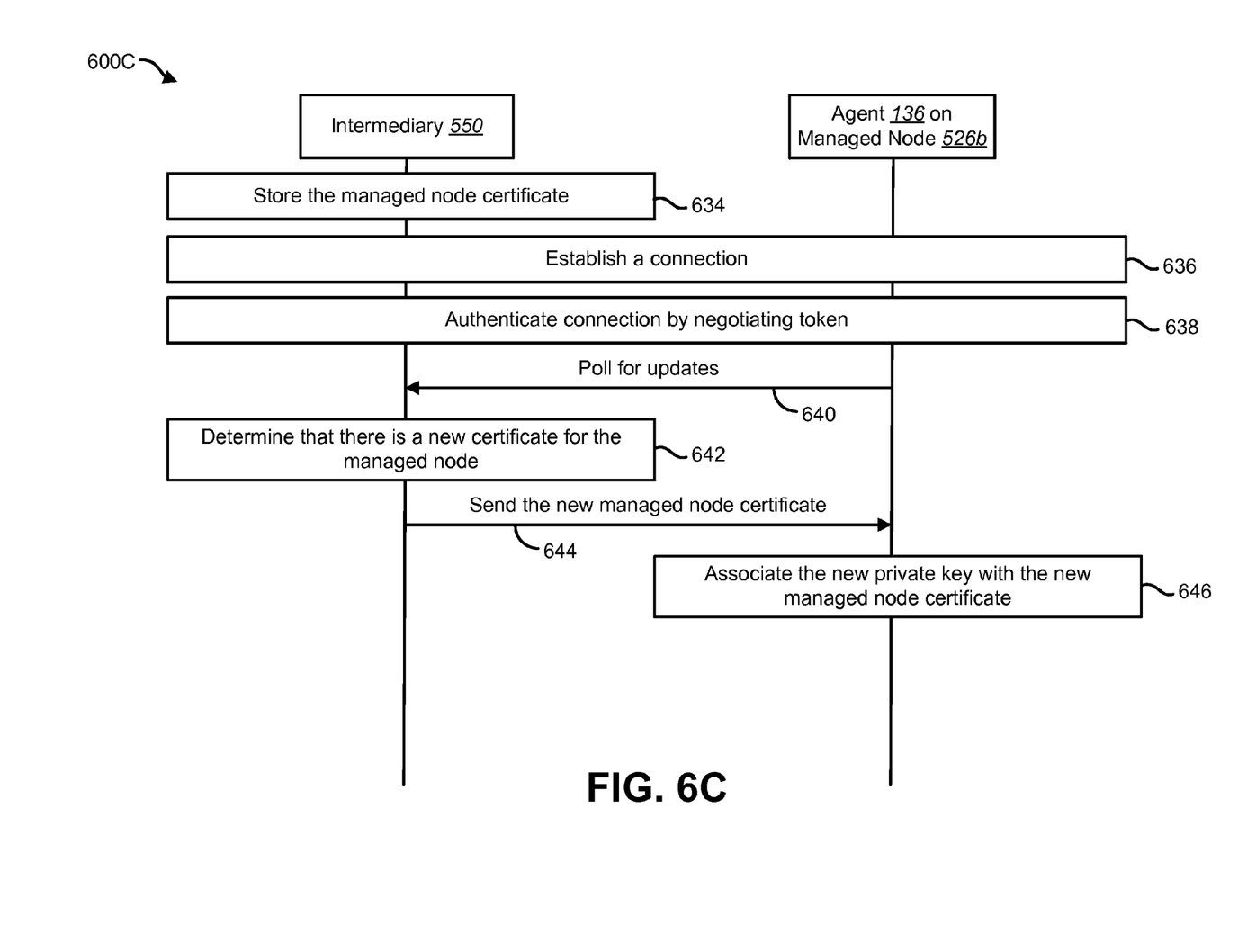

FIGS. 6A-C illustrate various key-pair and corresponding certificate-management operations performed by a managed node 526b and a core server 514 via an intermediary 550. Reference is initially made to FIG. 6A, which illustrates various operations 600A related to publishing a certificate request.

An agent 136 on the managed node 526b may monitor 604 the lifetime of the managed node's current key pair (public key 128 and private key 130) and its corresponding current managed node certificate 134. When the agent 136 determines 606 that the managed node's current key pair and certificate 134 will expire within a threshold period of time, the agent 136 may create 608 a new public key 128a and a new private key 130a for the managed node 126. The agent 136 may then create 610 a certificate request, which may include the newly created public key 128a and identifying information 132 of the managed node 126. This certificate request may then be signed 612 by the agent 136 with the managed node's new private key 130a. The agent 136 and the intermediary 550 may establish 613 a direct connection. The agent 136 may authenticate 614 the connection to the intermediary 550 by negotiating a token using the managed node's current private key 130. The agent 136 may send 616 its signed certificate request and the negotiated token to the intermediary 550. The intermediary 550 may store 618 the signed certificate request.

Steps 604 through 612 shown in FIG. 6A are similar to steps 302 through 310 shown in FIG. 3. Statements made previously regarding steps 302 through 310 in FIG. 3 are also applicable to steps 604 through 612 in FIG. 6A.

FIG. 6B illustrates various operations 600B pertaining to the retrieval of a certificate request stored by an intermediary 550. The core server 514 and the intermediary 550 may establish 619 a direct connection. The core server 514 may authenticate 620 the connection to the intermediary 550 by negotiating a token. The core server 514 may poll 621 the intermediary 550 for requests. Upon receiving a poll from the core server 514, the intermediary 550 may determine 622 that the poll corresponds to the stored certificate request. The intermediary 550 may then send 624 the certificate request to the core server 514.

Upon receipt of the certificate request from the intermediary 550, the core server 514 may use the identifying information 132 and the new public key 128a provided by the certificate request to issue 628 a new digital certificate 134a for the managed node 126. The core server 514 may then sign 630 the new managed node certificate 134a with its private key 118 and send 632 the new managed node certificate 134a to the intermediary 550, which may store 634 the new managed node certificate 134a.

Reference is now made to FIG. 6C. At some point after the intermediary 550 stores 634 the new managed node certificate 134a, the agent 136 and the intermediary 550 may establish 636 a direct connection. The agent 136 may authenticate 638 the connection to the intermediary 550 by negotiating a token. The agent 136 on the managed node 526b may poll 640 the intermediary 550 for any updates. Upon receipt of a polling message from the agent 136, the intermediary 550 may determine 642 that there is a new digital certificate 134a for the managed node 526b. The intermediary 550 may then send 644 the new managed node certificate 134a to the agent 136. Upon receipt of the new managed node certificate 134a, the agent 136 may associate 646 its newly created private key 130a with the new managed node certificate 134a. The agent 136 may then begin monitoring 604 (FIG. 6A) the lifetime of the new key pair and its corresponding new managed node certificate 134a.

Figure 7A:
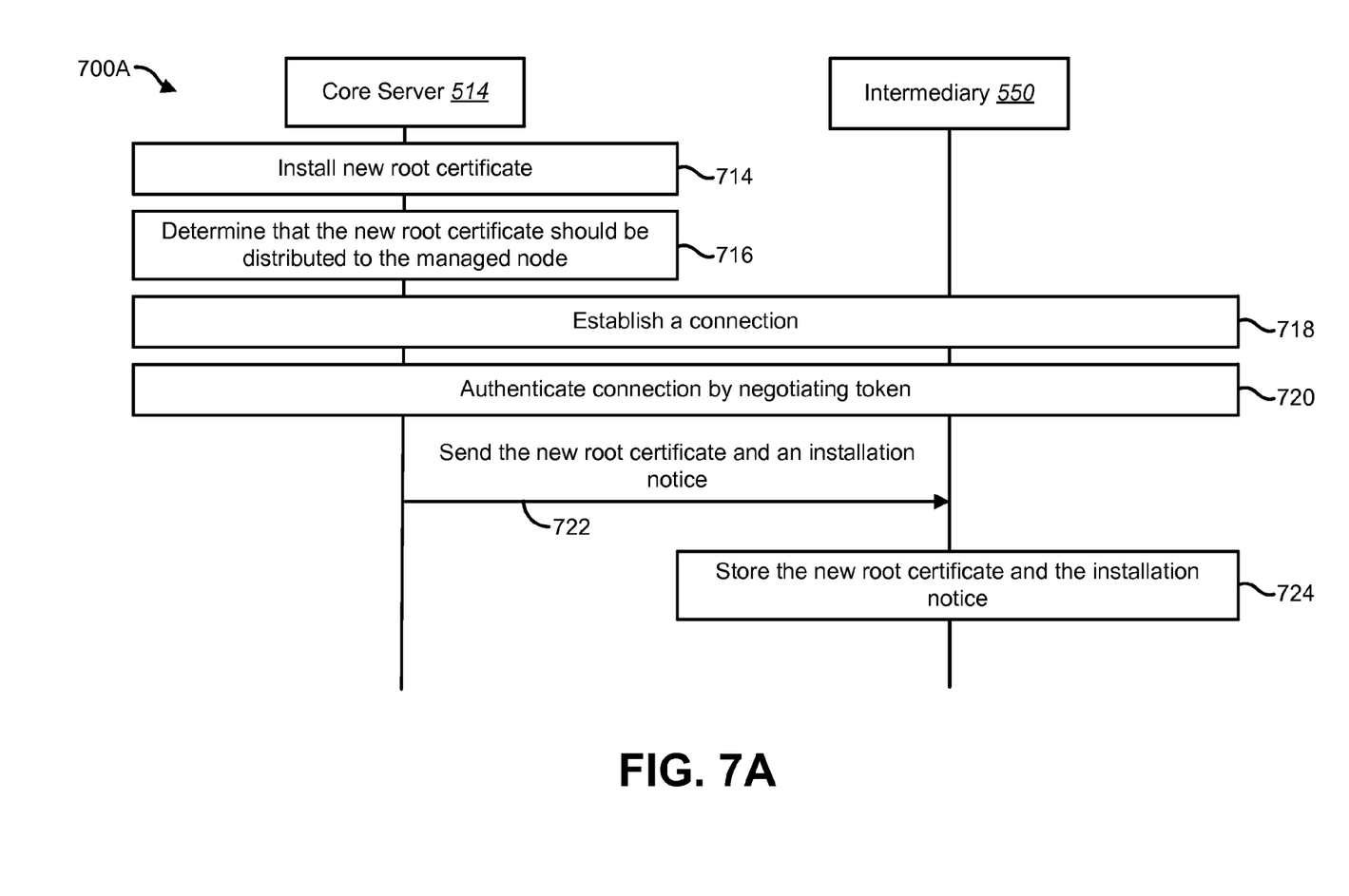
FIGS. 7A-B illustrate various operations that may be performed by a core server and a managed node with respect to a distribution of a new root certificate via an intermediary.
Figure 7B:
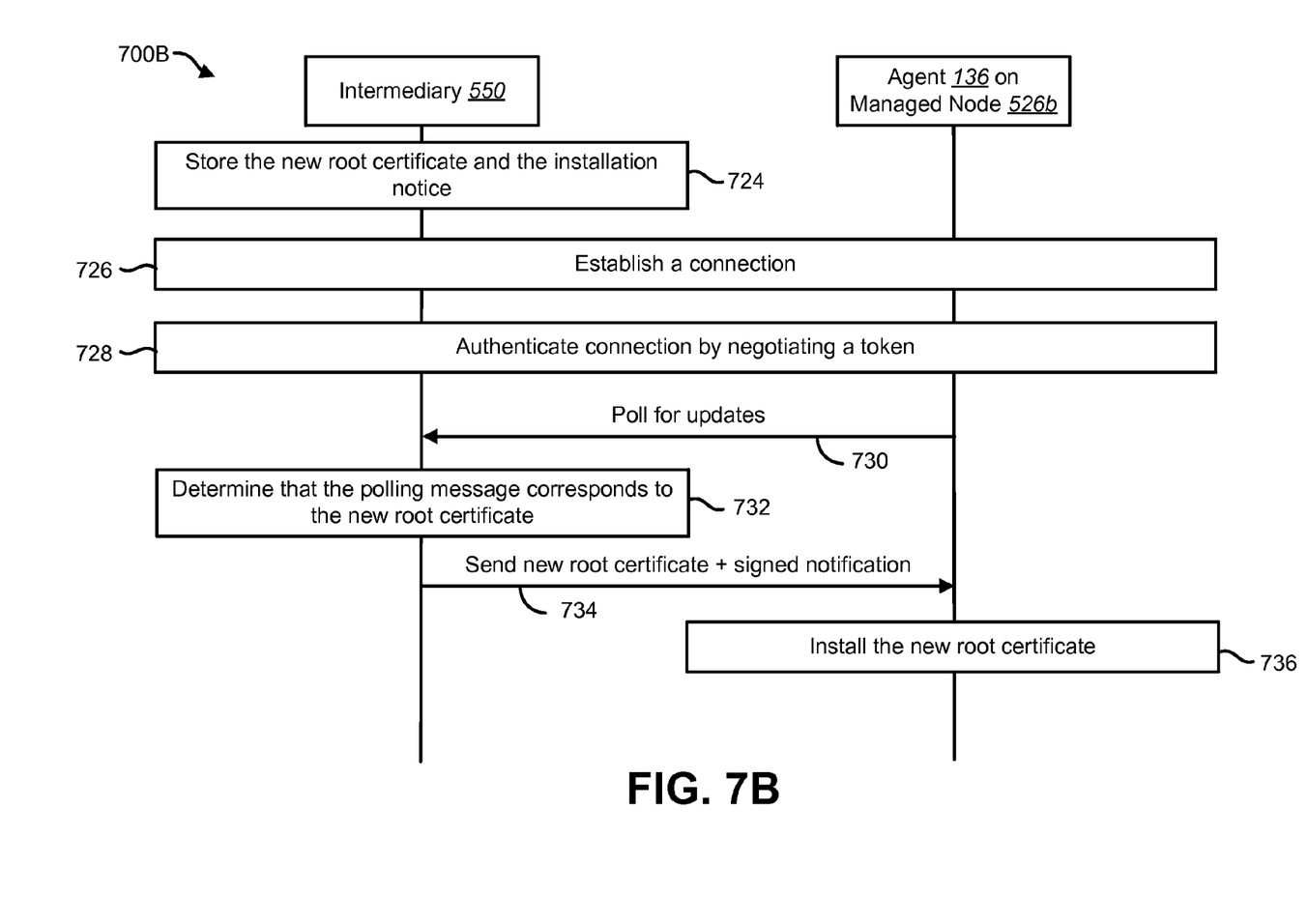

FIGS. 7A-B illustrate various operations that may be performed by a core server 514 and a managed node 526b with respect to the distribution of a new root certificate 106a via an intermediary 550. Reference is initially made to FIG. 7A, which illustrates various operations 700A that may be performed by a core server 514 and an intermediary 550 with respect to storing a new root certificate 106a.

At some time after the core server 514 has installed 714 a new root certificate 106a, the core server 514 may determine 716 that the new root certificate 106a should be distributed to the agent 136 operating on the managed node 526b. The core server 514 and the intermediary 550 may establish 718 a direct connection. The core server 514 may authenticate 720 the connection to the intermediary 550 by negotiating a token. The core server 514 may send 722 the new root certificate 106a to the intermediary 550 along with a notification signed by the current root certificate 106 for the agent 136 to download and install the new root certificate 106a. The intermediary 550 may then store 724 the new root certificate 106a with the installation notice.

FIG. 7B illustrates various operations 700B that may be performed by a managed node 526b and an intermediary 550 with respect to the retrieval of a stored new root certificate 106a. The managed node 526b and the intermediary 550 may establish 726 a connection. The agent 136 may authenticate 728 the connection to the intermediary 550 by negotiating a token.

The agent 136 may poll 730 the intermediary 550 for updates. In response to receiving a polling message from the managed node 526b, the intermediary 550 may determine 732 that the polling message corresponds to the stored new root certificate 106a. The intermediary 550 may then send 734 the new root certificate 106a and the installation notification signed by the current root certificate 106 to the agent 136. The agent 136 trusts the notification to install the new root certificate 106a because of the signature of the notification. Thus, the new root certificate 106a is authenticated using the current root certificate 106. The agent 136 may install 736 the new root certificate 106a for future secure communication.

Figure 8:
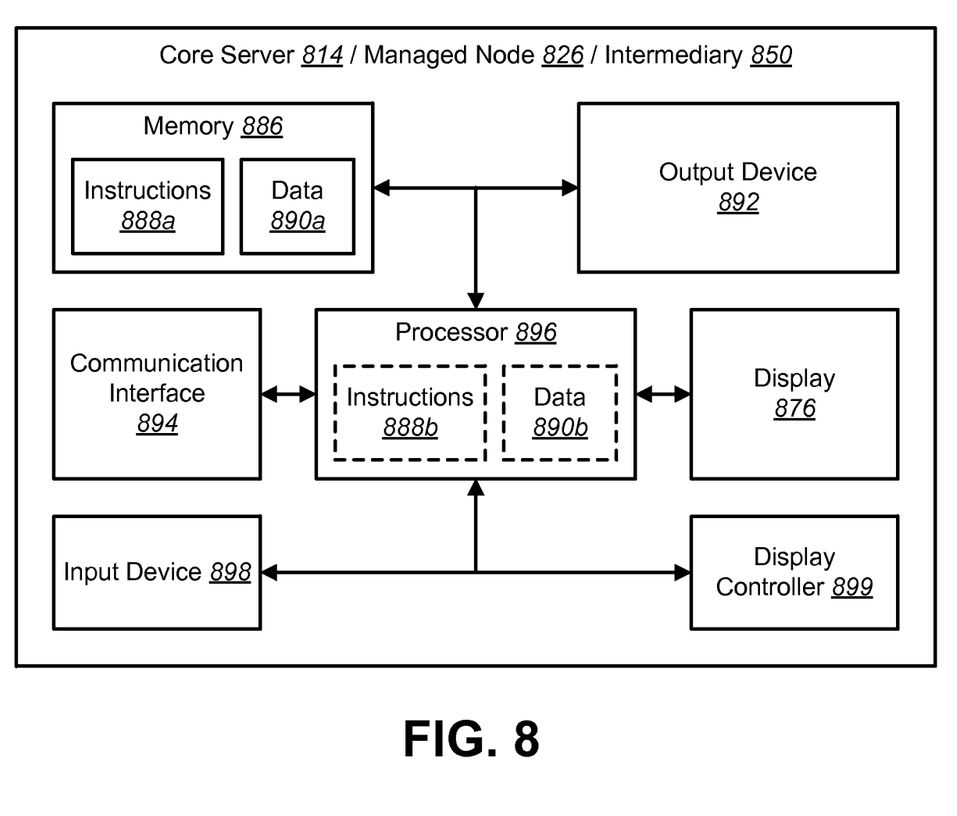
FIG. 8 illustrates various components that may be utilized in a core server and/or a managed node.

FIG. 8 illustrates various components that may be utilized in a core server 814, a managed node 826, and/or an intermediary 850. The illustrated components may be located within the same physical structure or in separate housings or structures. Any of the core servers 114, 514 (including the root core servers 114a, 514a), managed nodes 126, 526a-b, and/or intermediaries 550 described previously may include the components shown in FIG. 8.

The core server 814, managed node 826, and/or intermediary 850 may include a processor 896 and memory 886. The memory 886 may include instructions 888a and data 890a. The processor 896 controls the operation of the core server 814, managed node 826, and/or intermediary 850 and may be, for example, a microprocessor, a microcontroller, a digital signal processor (DSP) or other device known in the art. The processor 896 typically performs logical and arithmetic operations based on program instructions 888b and/or data 890b received from the memory 886.

The core server 814, managed node 826 and/or intermediary 850 typically may include one or more communication interfaces 894 for communicating with other electronic devices. The communication interfaces 894 may be based on wired communication technology, wireless communication technology, or both. Examples of different types of communication interfaces 894 include a serial port, a parallel port, a Universal Serial Bus (USB), an Ethernet adapter, an IEEE 894 bus interface, a small computer system interface (SCSI) bus interface, an infrared (IR) communication port, a Bluetooth wireless communication adapter, and so forth.

The core server 814, managed node 826, and/or intermediary 850 typically may include one or more input devices 898 and one or more output devices 892. Examples of different kinds of input devices 898 include a keyboard, mouse, microphone, remote control device, button, joystick, trackball, touchpad, lightpen, etc. Examples of different kinds of output devices 892 include a speaker, printer, etc. One specific type of output device that may be included in a computer system is a display device 876. Display devices 876 used with configurations disclosed herein may utilize any suitable image projection technology, such as liquid crystal display (LCD), light-emitting diode (LED), gas plasma, electroluminescence, a cathode ray tube (CRT), or the like. A display controller 899 may also be provided, for converting data stored in the memory 886 into text, graphics, and/or moving images (as appropriate) shown on the display device 876.

Of course, FIG. 8 illustrates only one possible configuration of a core server 814, managed node 826 and/or intermediary 850. Various other architectures and components may be utilized.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available non-transitory tangible medium that can be accessed by a computer or processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described methods. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for updating a digital certificate, comprising:
    determining, by a hardware processor, that a current public key and a current private key associated with a managed node will expire within a threshold period of time, wherein a current managed node certificate comprises the current public key and is associated with the current private key;
    creating a request for a new certificate for the managed node, wherein the request is created prior to expiration of the current managed node certificate;
    signing the request for the new certificate using a new private key; sending the request for the new certificate to a core server;
    receiving the new certificate from the core server; and
    associating the new certificate with the new private key;
    wherein the new certificate is requested and received without the managed node providing the core server with external authentication.

2. The method of claim 1, wherein creating the request for the new certificate comprises creating a new public key and the new private key for the managed node.

3. The method of claim 1, wherein the request for the new certificate comprises a new public key and information that identifies the managed node.

4. The method of claim 1, further comprising:
    receiving a new root certificate from the core server, wherein the new root certificate is received prior to expiration of a current root certificate; and
    authenticating the new root certificate using the current root certificate.

5. The method of claim 4, wherein the new root certificate is received and authenticated without external authentication with a certificate authority.

6. The method of claim 1, wherein communication between the managed node and the core server occurs via a direct connection between the managed node and the core server.

7. The method of claim 1, wherein communication between the managed node and the core server occurs via an intermediary.

8. The method of claim 1, wherein the method is performed automatically without human intervention.

9. A computing device that is configured for updating a digital certificate, comprising:
    a processor;
    memory in electronic communication with the processor; and
    instructions stored in the memory, the instructions being executable by the processor to:
        determine that a current public key and a current private key associated with a managed node will expire within a threshold period of time, wherein a current managed node certificate comprises the current public key and is associated with the current private key;
        create a request for a new certificate for the managed node, wherein the request is created prior to expiration of the current managed node certificate;
        sign the request for the new certificate using a new private key;
        send the request for the new certificate to a core server;
        receive the new certificate from the core server; and
        associate the new certificate with the new private key;
        wherein the new certificate is requested and received without the managed node providing the core server with external authentication.

10. The computing device of claim 9, wherein the instructions are also executable to:
    receive a new root certificate from the core server, wherein the new root certificate is received prior to expiration of a current root certificate; and
    authenticate the new root certificate using the current root certificate.

11. The computing device of claim 10, wherein the new root certificate is received and authenticated without external authentication with a certificate authority.

12. The computing device of claim 9, wherein communication between the managed node and the core server occurs via a direct connection or an intermediary.

13. A non-transitory tangible computer-readable medium for updating a digital certificate, comprising executable instructions which when executed by a processor cause the processor to:
    determine that a current public key and a current private key associated with a managed node will expire within a threshold period of time, wherein a current managed node certificate comprises the current public key and is associated with the current private key;
    create a request for a new certificate for the managed node, wherein the request is created prior to expiration of the current managed node certificate;
    sign the request for the new certificate using a new private key;
    send the request for the new certificate to a core server; and
    receive the new certificate from the core server;
    wherein the new certificate is requested and received without the managed node providing the core server with external authentication.

14. The computer-readable medium of claim 13, wherein the instructions are also executable for:
    receiving a new root certificate from the core server, wherein the new root certificate is received prior to expiration of a current root certificate; and
    authenticate the new root certificate using the current root certificate.

15. The computer-readable medium of claim 14, wherein the new root certificate is received and authenticated without external authentication with a certificate authority.

16. The computer-readable medium of claim 13, wherein communication between the managed node and the core server occurs via a direct connection or an intermediary.

* * * * *